United States Patent
Kwak et al.

(10) Patent No.: US 11,405,198 B2
(45) Date of Patent: Aug. 2, 2022

(54) SYSTEM AND METHOD FOR STORING AND MANAGING KEYS FOR SIGNING TRANSACTIONS USING KEY OF CLUSTER MANAGED IN TRUSTED EXECUTION ENVIRONMENT

(71) Applicant: TEEware Co., Ltd., Daejeon (KR)

(72) Inventors: Nohyun Kwak, Daejeon (KR); Yunjong Jeong, Daejeon (KR)

(73) Assignee: TEEWARE CO., LTD., Daejeon (KR)

( * ) Notice: Subject to any disclaimer, the term of this patent is extended or adjusted under 35 U.S.C. 154(b) by 252 days.

(21) Appl. No.: 16/698,439

(22) Filed: Nov. 27, 2019

(65) Prior Publication Data

US 2020/0259646 A1 Aug. 13, 2020

(30) Foreign Application Priority Data

Feb. 13, 2019 (KR) .......................... 1020190016464
Feb. 13, 2019 (KR) .......................... 1020190016467

(51) Int. Cl.
| | | |
|---|---|---|
| *H04L 9/08* | (2006.01) | |
| *G06F 21/53* | (2013.01) | |
| *H04L 9/30* | (2006.01) | |
| *H04L 9/32* | (2006.01) | |
| *G06F 21/31* | (2013.01) | |
| *G06Q 20/38* | (2012.01) | |

(52) U.S. Cl.
CPC ............ *H04L 9/0894* (2013.01); *G06F 21/31* (2013.01); *G06F 21/53* (2013.01); *G06Q 20/3829* (2013.01); *H04L 9/30* (2013.01); *H04L 9/3247* (2013.01); *H04L 9/3263* (2013.01); *G06Q 2220/00* (2013.01)

(58) Field of Classification Search
CPC ..................................................... H04L 9/0894
See application file for complete search history.

(56) References Cited

U.S. PATENT DOCUMENTS

| | | | | |
|---|---|---|---|---|
| 2015/0310427 A1* | 10/2015 | Yl | ........................... | G06F 21/84 705/64 |
| 2018/0191503 A1* | 7/2018 | Alwar | ..................... | G06Q 20/10 |
| 2019/0354970 A1* | 11/2019 | Di Iorio | ............. | G06Q 20/3829 |
| 2019/0375373 A1* | 12/2019 | Pepe | ..................... | H04L 9/3239 |

FOREIGN PATENT DOCUMENTS

| | | |
|---|---|---|
| KR | 10-2017-1776172 | 9/2017 |
| KR | 10-2016-0113264 | 9/2018 |
| KR | 10-2018-0102269 | 9/2018 |

OTHER PUBLICATIONS

Goldfeder, Steven et al., Securing Bitcoin wallets via a new DSA/ECDSA threshold signature scheme, 2015, (26 pages).
Fritsche, Ricardo Vieira, Recommendations for Implementing a Bitcoin Wallet Using Smart Card, UFSC, Universidade Federal De Santa Catarina INE—Departamento de Informatica e Estatistica, Computer Science, Florianópolis, Brazil, 2018, (47 pages).

* cited by examiner

*Primary Examiner* — Bradley W Holder
(74) *Attorney, Agent, or Firm* — McCracken & Gillen LLC

(57) ABSTRACT

A transaction signature method performed in a system for storing and managing keys, which is implemented as a computer, may include the steps of configuring a cluster based on a node and generating a private key according to a BIP-32 protocol from an internal key of the cluster among a plurality of managed keys in a trusted execution environment (TEE) of the node within the configured cluster and signing transactions.

6 Claims, 20 Drawing Sheets

|  D |  B |
|---|---|
| Device auth private key and certificate (RSA) | BIP-32 root seed |

FIG. 5

| D 🔑 | B 🔑 | T 🔑 | P 🔑 |
|---|---|---|---|
| Device auth private key and certificate (RSA) | BIP-32 root seed | Threshold seed | Paillier symmetric key $(n, g, \lambda, \mu)$ |

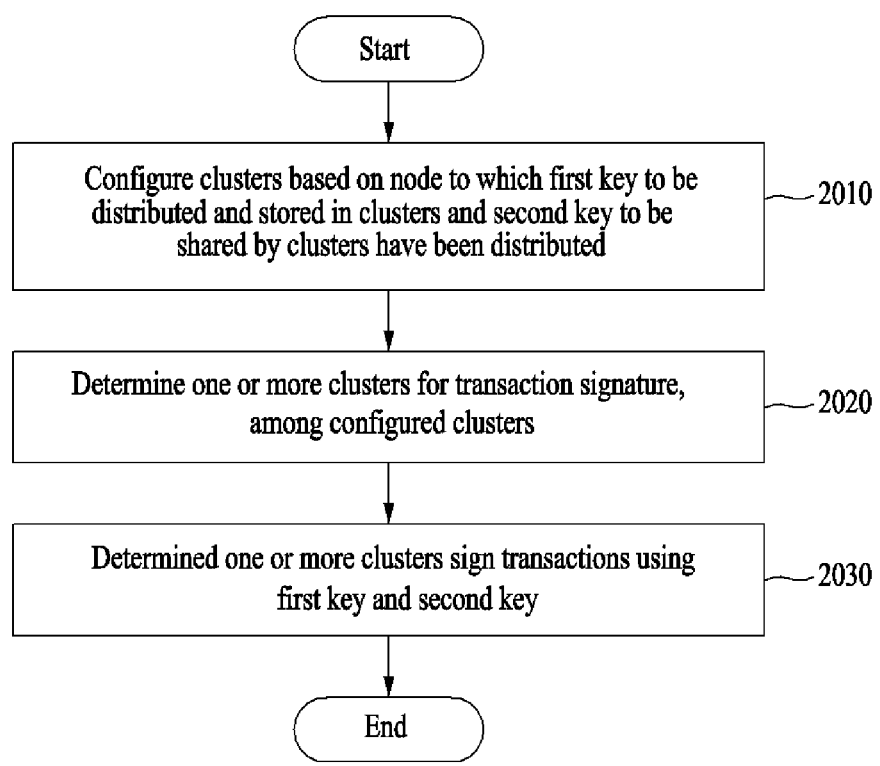

SYSTEM AND METHOD FOR STORING AND MANAGING KEYS FOR SIGNING TRANSACTIONS USING KEY OF CLUSTER MANAGED IN TRUSTED EXECUTION ENVIRONMENT

CROSS REFERENCE TO RELATED APPLICATION

This application is based on and claims priority under 35 U.S.C. 119 to Korean Patent Application No. 10-2019-0016464 and 10-2019-0016467, both filed on Feb. 13, 2019, in the Korean Intellectual Property Office, the disclosures of which is herein incorporated by reference in their entireties.

BACKGROUND OF THE INVENTION

1. Technical Field

The following solution describes a key management solution based on a trusted execution environment and, more particularly, a method and system for storing and managing keys conveniently and safely based on a trusted execution environment.

2. Description of the Related Art

Cryptocurrency refers to currency which is not a physical embodiment, such as a bill or a coin, and traded online. Unlike common currency issued by the government or central bank of each country, cryptocurrency is priced based on a rule determined by a person who has first invented the cryptocurrency. A transaction history of cryptocurrency is not managed by a government or a central bank, and the cryptocurrency is distributed based on the blockchain technology. Accordingly, a government does not guarantee the price or payment of cryptocurrency. Cryptocurrency is processed using a distributed system method based on the blockchain technology in which data is contained in blocks and the blocks are connected in a chain form and are duplicated and stored in many computers at the same time. A person who participates in the distributed system is called a miner, and receives a commission of a coin form in compensation for blockchain processing. There is no production cost according to currency issues and a transaction cost, such as a transfer cost, can be significantly reduced because cryptocurrency is maintained through such a structure. Furthermore, cryptocurrency has advantages in that the cryptocurrency does not require a storage cost because it is stored in a computer hard disk and it has a function as excellent value storage means because there is no danger of robbery or a loss.

A trusted execution environment (TEE) means a secure execution environment in which the integrity of a code isolated and executed from the REE and the confidentiality of data generated and stored in an execution process are guaranteed. The trusted execution environment is an advanced security technology with which only advantages of hardware and software have been combined, and provides security of a separated hardware level while it is not separate hardware. It is necessary to develop a solution capable of storing and managing keys effectively and securely based on such a trusted execution environment.

SUMMARY OF THE INVENTION

An embodiment may provide a method and system for storing and managing keys conveniently and safely based on a trusted execution environment. Specifically, an embodiment may provide a method and system in which a cluster in which a key is shared is configured, a key is generated in the trusted execution environment of a node within the cluster, the key is synchronized with a different trusted execution environment within the cluster and managed, a private key is generated from an internal key (B key) of the cluster, among a plurality of stored and managed keys according to a BIP-32 protocol, and transactions are signed.

An embodiment may provide a method and system for storing and managing keys conveniently and safely based on a trusted execution environment. Specifically, an embodiment may provide a method and system in which one or more clusters for transaction signatures are determined among clusters configured based on a node to which a threshold key to be distributed and stored in clusters and the same shape encryption key to be shared by clusters have been distributed, and transactions are signed using a first key and a second key in the determined one or more clusters.

A transaction signature method performed in a system for storing and managing keys, which is implemented as a computer, may include the steps of configuring a cluster based on a node and generating a private key according to a BIP-32 protocol from an internal key of the cluster among a plurality of managed keys in a trusted execution environment (TEE) of the node within the configured cluster and signing transactions.

A transaction signature method performed in a system for storing and managing keys, which is implemented as a computer, may include configuring clusters based on a node to which a first key to be distributed and stored in clusters and a second key to be shared by clusters, determining one or more clusters for a transaction signature among the configured clusters, and signing, by the determined one or more clusters, transactions using the first key and the second key.

BRIEF DESCRIPTION OF THE DRAWINGS

FIGS. 4 and 5 are diagrams for illustrating keys stored and managed in the system for storing and managing keys according to an embodiment.

FIG. 20 is a flowchart illustrating a method of signing transactions based on a threshold signature method using a key of a cluster in the system for storing and managing keys according to an embodiment.

DETAILED DESCRIPTION

Embodiments of the present invention are described in detail with reference to the accompanying drawings.

Figure 1:
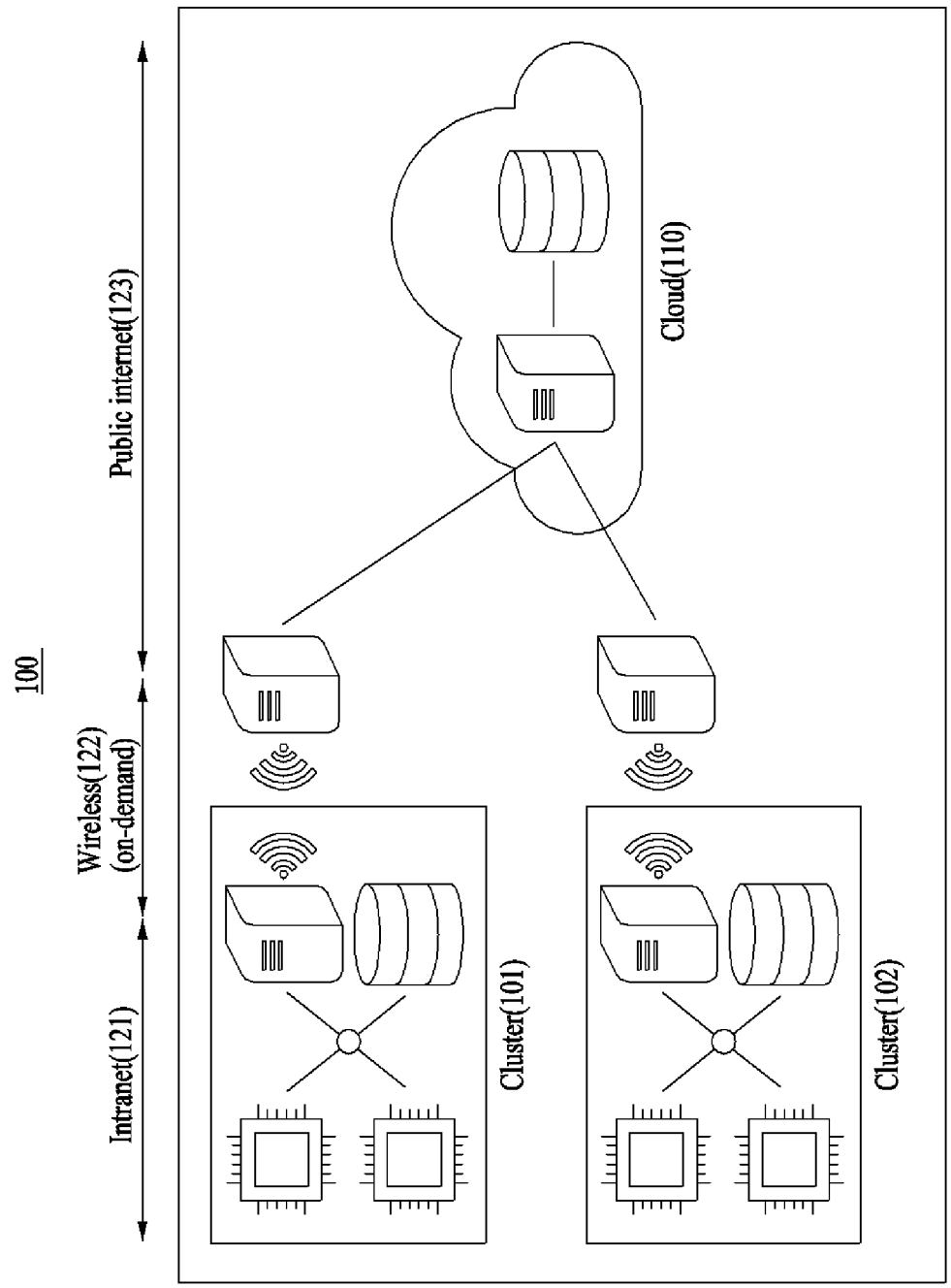
FIG. 1 is a diagram for illustrating a schematic structure for the custody service of a system for storing and managing keys according to an embodiment.

FIG. 1 is a diagram for illustrating a schematic structure for the custody service of a system for storing and managing keys according to an embodiment.

The system 100 for storing and managing keys may configure a schematic structure for a custody service to which a trusted execution environment is applied. The system 100 for storing and managing keys may perform key storage and management for a custody service for each cluster. The custody service to which the trusted execution environment is applied may be configured with a plurality of clusters 101 and 102 and a cloud server 110. The internal components of the cluster have been separated from an external network, and they may be connected over an Intranet 121. The inside and outside of the cluster may be connected only when it is needed only on-demand 122 through a separate channel, for example, QR code printing or Bluetooth not the Internet. The Internet 123 may be connected between an external component of the cluster and the cloud server 110. Such a structure can incorporate an advantage of a secure cold wallet because the Internet is not connected, and can supplement disadvantages, such as use convenience and a response time in a cold wallet.

Figure 2:
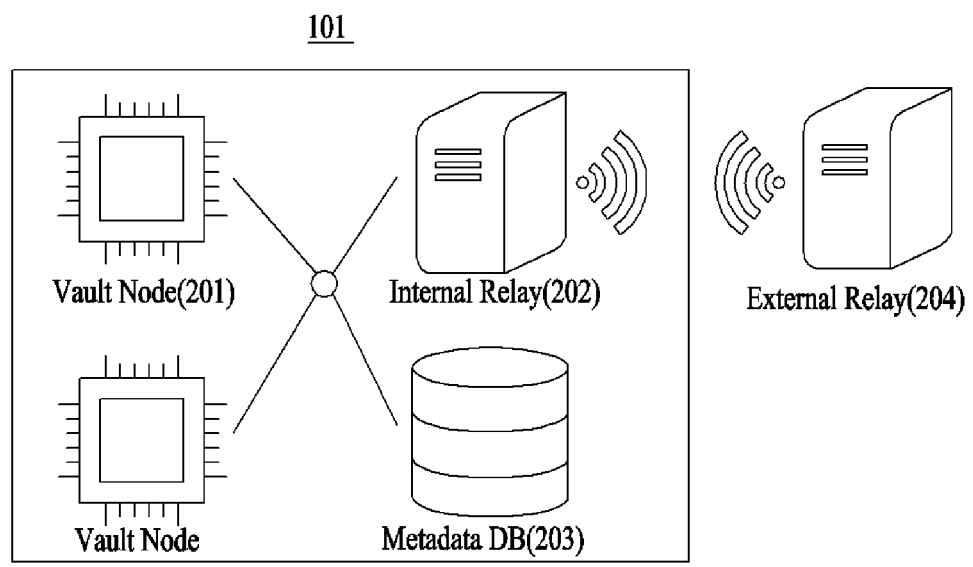
FIG. 2 is a diagram for illustrating the structure of a cluster in the system for storing and managing keys according to an embodiment.

FIG. 2 is a diagram for illustrating the structure of a cluster in the system for storing and managing keys according to an embodiment.

The structure of one cluster (e.g., 101) of the plurality of clusters 101 and 102 illustrated in FIG. 1 is described. The cluster 101 may be a trusted execution environment (TEE) vault cluster for the custody service based on the TEE.

The cluster 101 means a set of nodes in which the same key information is duplicated and stored in preparation for the physical defect or obstacle of a node (hereinafter referred to as a "vault node"). Accordingly, keys are stored for each cluster. The clusters may be disposed and managed in physically separated data centers.

A vault node 201 may perform a function for generating and signing keys safely in the TEE based on independent hardware (e.g., CPU). Keys generated in the cluster 101 may be automatically synchronized between all the vault nodes within a cluster and stored. The vault nodes 201 may secure safe communication channel based on the TEE and share key information. Although an obstacle occurs in one vault node, the same function can be provided through a different vault node.

A metadata database (DB) 203 includes a database management system (DBMS) in order to manage information other than key information, and may store a request history for a vault node and the record of executed results in a metadata form. In this case, important information may be stored in the vault node 201. Additional information other than the important information, for example, the storage date of data, the owning of data, and whether there is a signature may be stored in the metadata DB 203 in a log form.

An internal relay 202 and an external relay 204 may be computer devices, such as a server. The internal relay 202 may provide an interface for processing a task requested outside the cluster, and may function to manage the vault nodes within the cluster. The external relay 204 may request key generation and signing from the cluster through a separate channel not the Internet. A function may be performed through only an interface provided by the internal relay of the cluster. Accordingly, a point where a hacker can attack is reduced to the least extent.

Furthermore, the system for storing and managing keys is designed to be extensible so that a plurality of clusters can be configured in terms of operations. Accordingly, the system can be separately managed based on a customer of the custody service and can be separately managed based on the number of keys that may be accommodated by a cluster. In this case, in order to support a threshold signature, n (n is a natural number) clusters need to be configured according to a t-of-n configuration. For example, clusters are necessary in order to support a 3-of-6 threshold signature. For example, 6 clusters may be disposed at physically isolated places (or areas), and signatures may be performed at 3 clusters in response to a signature request, among the physically isolated 6 clusters.

Figure 3:
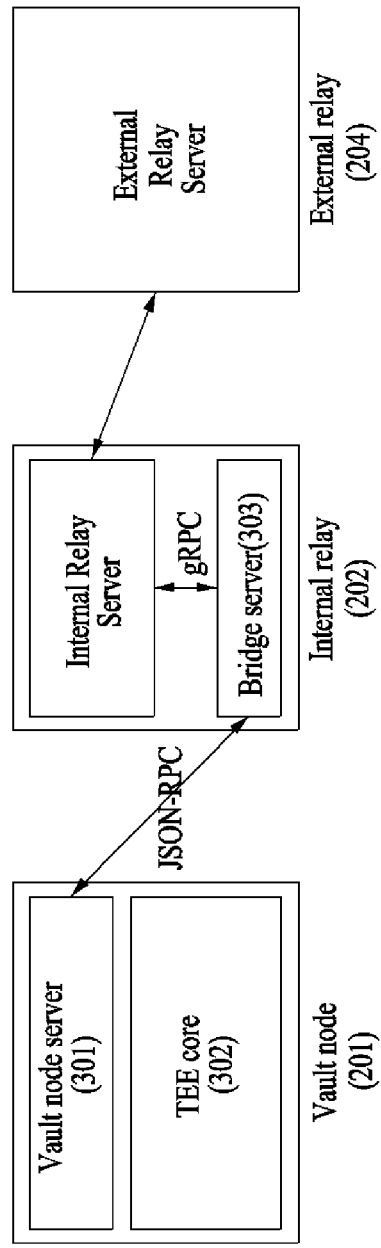
FIG. 3 is a diagram for illustrating the software structure of the system for storing and managing keys according to an embodiment.

FIG. 3 is a diagram for illustrating the software structure of the system for storing and managing keys according to an embodiment.

The system for storing and managing keys may provide software for the custody service based on the TEE. The software for the custody service based on the TEE may be configured with a TEE core 302, a vault node server 301 and a bridge server 303. Referring to FIG. 3, the TEE core 302 and the vault node server 301 may be configured in the vault node 201, and the bridge server 303 may be configured in the internal relay 202.

The vault node server 301 is software executed in a rich execution environment (REE) of the vault node 201, and may perform a role for relaying a request and a response between the TEE core 302 and the bridge server 303 and a role for maintaining a backup state between vault nodes. In this case, the REE corresponds to an execution environment other than the TEE, and means a common execution environment.

The TEE core 302 is software executed only within the TEE and may be executed in response to an external request through a limited interface. Accordingly, safety against an external attack can be provided because a code or memory of the TEE core 302 cannot be accessed without the intervention of a predetermined interface. The TEE core 302 may generate its own secure storage which cannot be accessed by different software, and may be used to store important data, such as a key, in the storage. In terms of functions, the TEE core 302 may be configured with a key management unit for generating and storing keys and a verification unit for checking whether a request is a valid value.

The bridge server 303 is software installed in the internal relay 202 functions to relay a request and a response between the vault node 201 and an internal relay server, and may function to manage the vault node 201. A gRPC server is open in the bridge server 303. Accordingly, different software of the internal relay 202 can communicate with the vault node 201 through gRPC invoking. Such communication can be performed through a method, such as JSON-RPC or a REST API, in addition to gRPC.

The hardware structure of the system for storing and managing keys is described below. The following hardware structure is merely an example and is not limited thereto. Hardware necessary to use key storage and management according to an embodiment may include a computer supporting a TEE (e.g., a TrustZone support board (hereinafter referred to as a "TZ board") or an Intel SGX support computer), a server, and a router. It is recommended that clusters configured with corresponding hardware are distributed to physically separated spaces, for example, data centers.

In common requirements for the TZ board, the TZ board needs to be an ARM board that provides a TrustZone function, and the REE can support Linux or Android operating system (OS). The TEE needs to execute the TEE OS that supports the GlobalPlatform API.

The Intel SGX support computer needs to include a CPU having the Intel SGX function, which needs to be supported in a corresponding OS.

The server may function as an internal relay. The server needs to support an interface (e.g., Bluetooth) that enables communication with an external relay. The router may function to connect the components of the cluster through Ethernet. For security, a radio function is not provided or the use of a product capable of deactivating a radio function is recommended.

Figure 4:
Figure 4:

FIGS. 4 and 5 are diagrams for illustrating keys stored and managed in the system for storing and managing keys according to an embodiment.

The system for storing and managing keys may store and manage keys. For example, referring to FIG. 4, the system for storing and managing keys may store and manage a D key and a B key in the TEE area of a vault node safely.

The D key (per vault node) is a key for authenticating a vault node (or device) in communication between vault nodes. Before a vault node is included in a cluster, a D key is generated and device CA is requested from a custody service administrator.

The B key (per cluster) is the root seed of BIP-32 method cryptocurrency. The B key is generated after a vault node is installed in a data center. The B key is backed up and stored between internal vault nodes within a cluster.

For another example, referring to FIG. 5, the system for storing and managing keys may safely store and manage a D key, a B key, a T key and a P key in the TEE area of a vault node.

The D key (per vault node) is a key for authenticating a vault node (or device) in communication between vault nodes, such as a middle value exchange for generating a threshold signature. Before a vault node is included in a cluster, a D key is generated and is signed by a custody service operating company.

The B key (per cluster) is the root seed of BIP-32 method cryptocurrency. A B key is generated after a vault node is installed in a data center. The B key is backed up and stored between internal vault nodes of a cluster.

The T key (per cluster) is a key used for a signature through a threshold signature method. After an operating company generates a T key in an initialization step, a vault node imports the T key from the operating company. The T key is backed up and stored between internal vault nodes of a cluster.

The P key (global) is the same shape encryption key for encrypting a threshold signature middle value. After an operating company generates a P key in an initialization step, a vault node imports the P key from the operating company. All vault nodes share the same P key.

Figure 6:
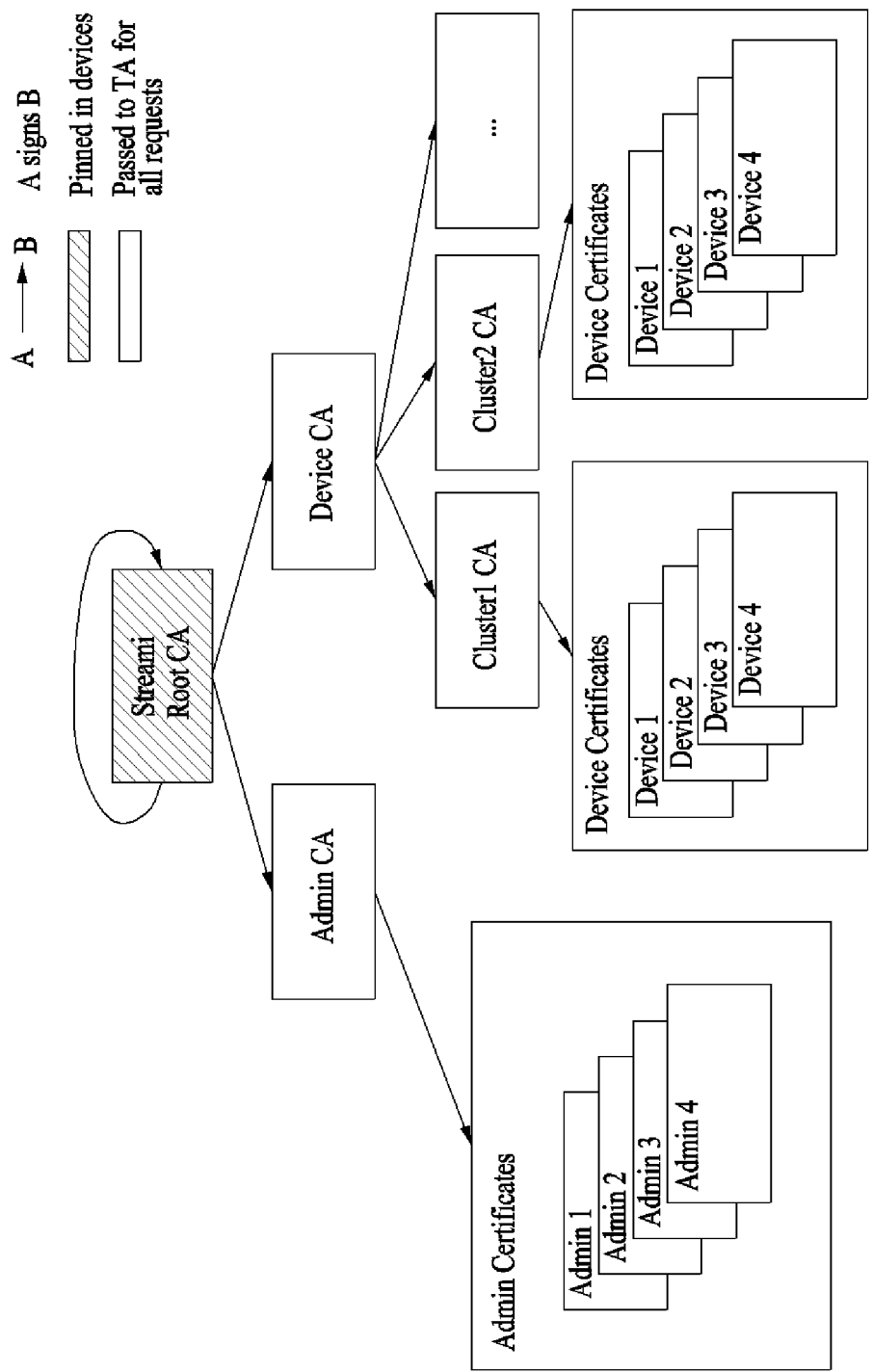
FIG. 6 is a diagram for illustrating the certificate structure of the system for storing and managing keys according to an embodiment.

FIG. 6 is a diagram for illustrating the certificate structure of the system for storing and managing keys according to an embodiment.

A CA certificate may be configured as follows. Certificate authority (CA) is a unit by which a digital certificate is issued, and is an objective third party which can be trusted by everyone and functions to evidence that a public key is owned by a specific entity. In an embodiment, the CA may be used to verify whether a vault node is a valid device or to authenticate a user. In this case, the CA may be generated by a custody service operating company.

Root CA is stored in the TEE area of a vault node. The root CA may be used to authenticate an administrator (admin) and a vault node (or device). The certificate also includes the concept of a private key capable of being signed. The certificate may be basically divided into a CA certificate and an end-user certificate. The CA certificate is managed for each department and is the subject of authentication.

Root CA is the root certificate of an operating company and may be used to authenticate administrator CA and device CA as the root of trust.

Adimin CA is an administrator management department certificate and may be used to authenticate an administrator who is responsible for a transaction signature.

Device CA is a device management department certificate and may be used to authenticate a cluster CA that authenticates a cluster administration organization.

Cluster CA is a cluster management department certificate and may be used to authenticate a vault node within a cluster.

An end-user certificate may be configured as follows.

Admin #n is an administrator certificate, and it is owned by each administrator and becomes a valid certificate only when it is issued by Admin CA. Only a transaction request signed through an Admin certificate is determined to be valid.

Device #n is a vault node certificate, and it is owned by each vault node and becomes a valid certificate only when it is issued by Cluster CA. When communication is performed between vault nodes, data signed through the certificate can be trusted.

Figure 7:
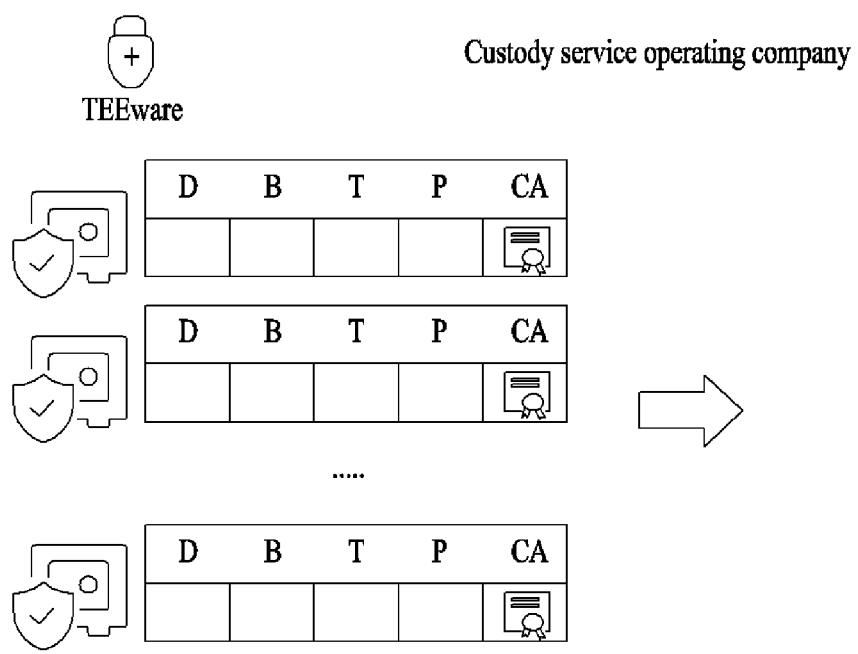
FIG. 7 is a diagram for illustrating that a CA certificate is generated in the system for storing and managing keys according to an embodiment.

FIG. 7 is a diagram for illustrating that a CA certificate is generated in the system for storing and managing keys according to an embodiment.

CA generated as software and transmitted by an operating company may be inserted and provided to all vault nodes. The CA has been generated by the operating company, and may be used to verify whether a policy in operation is a valid device and is an administrator approved by an operating company.

Figure 8:
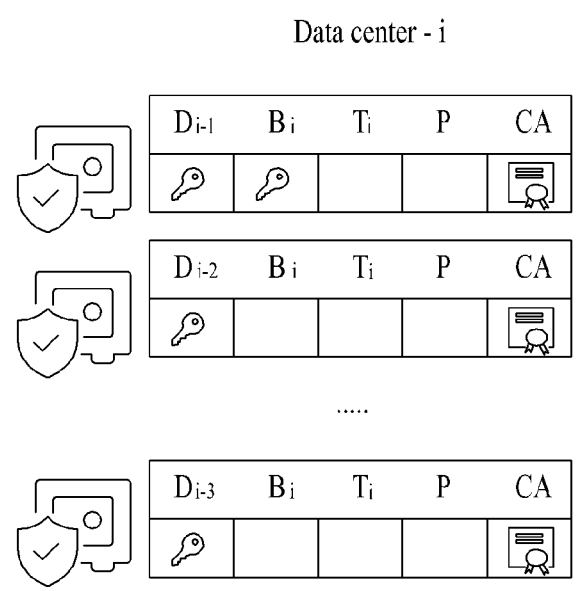
FIGS. 8 to 9 are diagrams for illustrating that keys are generated and distributed in the system for storing and managing keys according to an embodiment.
Figure 9:
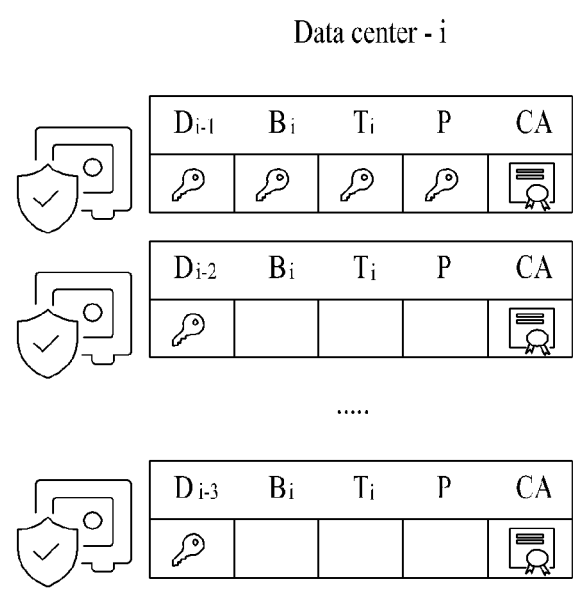

FIGS. 8 to 9 are diagrams for illustrating that keys are generated and distributed in the system for storing and managing keys according to an embodiment.

FIGS. 8 and 9 illustrate that the internal key D of a cluster is generated. The internal key $D_{i\text{-}j}$ of a cluster may be generated for all vault nodes within an $i^{th}$ cluster. The internal key $D_{i\text{-}j}$ of the cluster means a device-unique key owned by the $j^{th}$ vault node of the $i^{th}$ cluster. A process of approving and storing a device certificate through the internal key $D_{i\text{-}j}$ of a cluster is described below.

An administrator may request a certificate signing request (CSR) for the internal key of the cluster from a vault node j. The CSR is a format that a public key owner requests a CA to issue a certificate. The CSR includes a public key that will issue a certificate, information (e.g., domain) on a public key owner, and integrity protection (e.g., electronic signature). The vault node j may generate CSR for the internal key $D_{i\text{-}j}$ of the cluster and transmit the CSR to an administrator. The administrator may request a signature from a device CA using the CSR. The device CA may verify the CSR, may sign the CSR, and may generate a certificate for the internal key $D_{i\text{-}j}$ of the cluster. The administrator may store the generated certificate in the vault node j.

Figure 10:
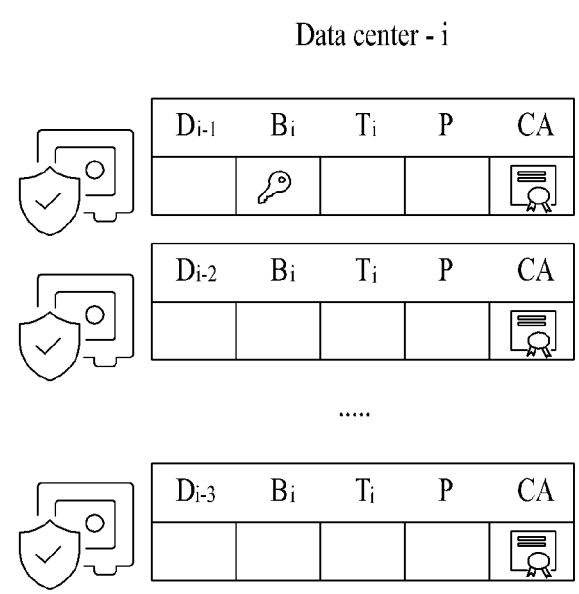
FIGS. 10 to 11 illustrate an operation of generating and distributing keys in order to sign transactions based on a BIP-32 protocol from an internal key of a cluster managed in a trusted execution environment in the system for storing and managing keys according to an embodiment.
Figure 11:
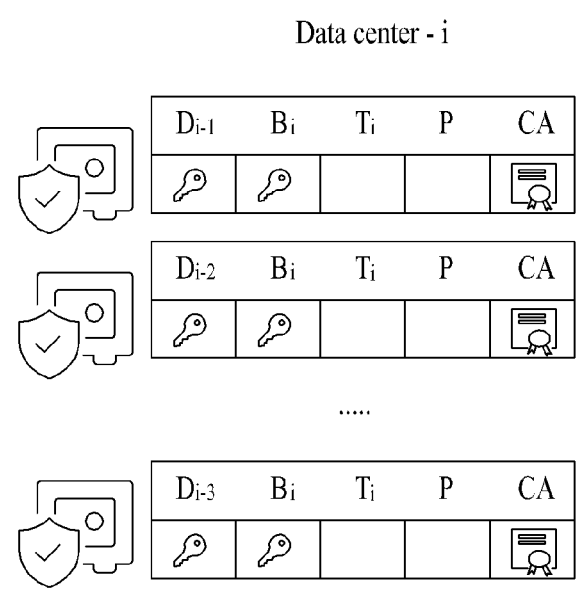

FIGS. 10 to 11 illustrate an operation of generating and distributing keys in order to sign transactions based on a BIP-32 protocol from an internal key of a cluster managed in a TEE in the system for storing and managing keys according to an embodiment.

FIG. 10 illustrates that the internal key B of a cluster is generated. A vault node may be transmitted to a data center where an $i^{th}$ cluster to which the vault node belongs is located. An administrator who is responsible for the cluster in a data center may configure the $i^{th}$ cluster based on the vault node. First, the administrator may request the vault node to generate the internal key $B_i$ of the cluster. In this case, a key generation sequence is not related to the generation of a D key and the generation of a B key. The internal key $B_i$ of the cluster means a BIP-32 root seed to be shared between vault nodes (or devices) in the $i^{th}$ cluster.

FIG. 11 illustrates that the B key of a cluster is generated. As described above, a generated $B_i$ key is synchronized with different vault nodes within a cluster and the same key is shared between the different vault nodes. When vault nodes belonging to an $i^{th}$ cluster are connected to the Intranet of the cluster, the vault nodes may access a bridge server and update key information belonging to the cluster and key information stored by the vault nodes. A synchronization process is described below.

A vault node may be connected the Intranet of a cluster. The vault node may inquire the key list of the cluster through a bridge server. If the key list includes a key not present in the vault node itself, the vault node may request duplication from a different vault node within the cluster in which the key is stored. The different vault node that stores the key may identify whether the request from the vault node has been received from an authenticated device, and may then duplicate the key. In this case, the duplication of the key may be performed through device authentication based on the certificate. For example, a vault node (e.g., vault node B) may transmit the certificate of the vault node to a different vault node (e.g., vault node A) while requesting the different vault node to send a key. After the different vault node verifies the certificate received from the vault node, it may encrypt a $B_i$ key using the public key of the vault node included in the certificate, and may transmit the encrypted $B_i$ key to the vault node. The vault node may receive the encrypted $B_i$ key, may decode the received encrypted $B_i$ key, and may store the decoded $B_i$ key. The subject that authenticates that a device is an authenticated device is Device CA. A thorough guideline for a key management signature is necessary for the Device CA. A process of duplicating a key from a different vault node within a cluster to a vault node is described below specifically.

FIGS. 12 to 15 illustrate an operation of generating and distributing keys in order to sign transactions based on a threshold signature method in the system for storing and managing keys according to an embodiment.

Figure 12:
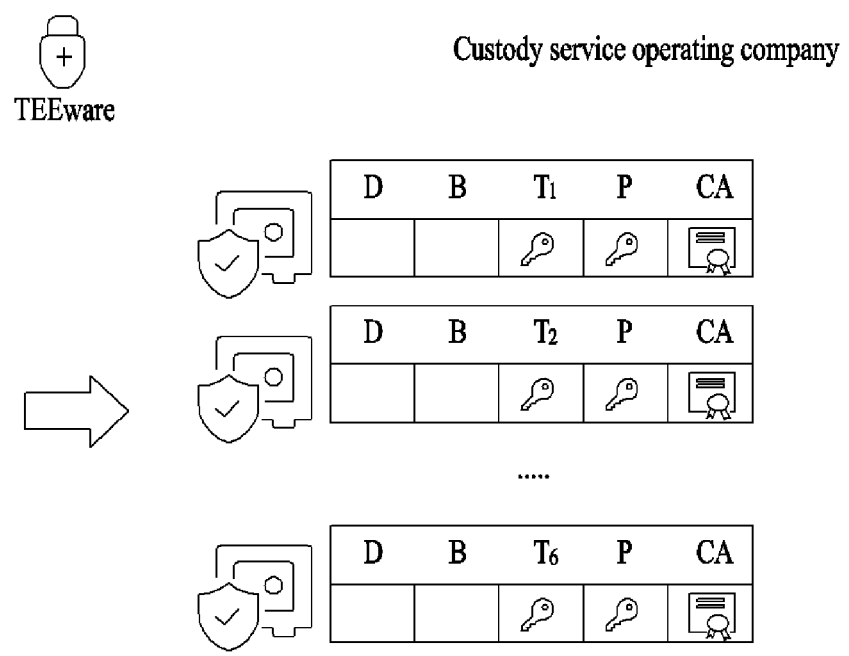
FIGS. 12 to 15 illustrate an operation of generating and distributing keys in order to sign transactions based on a threshold signature method in the system for storing and managing keys according to an embodiment.
Figure 13:
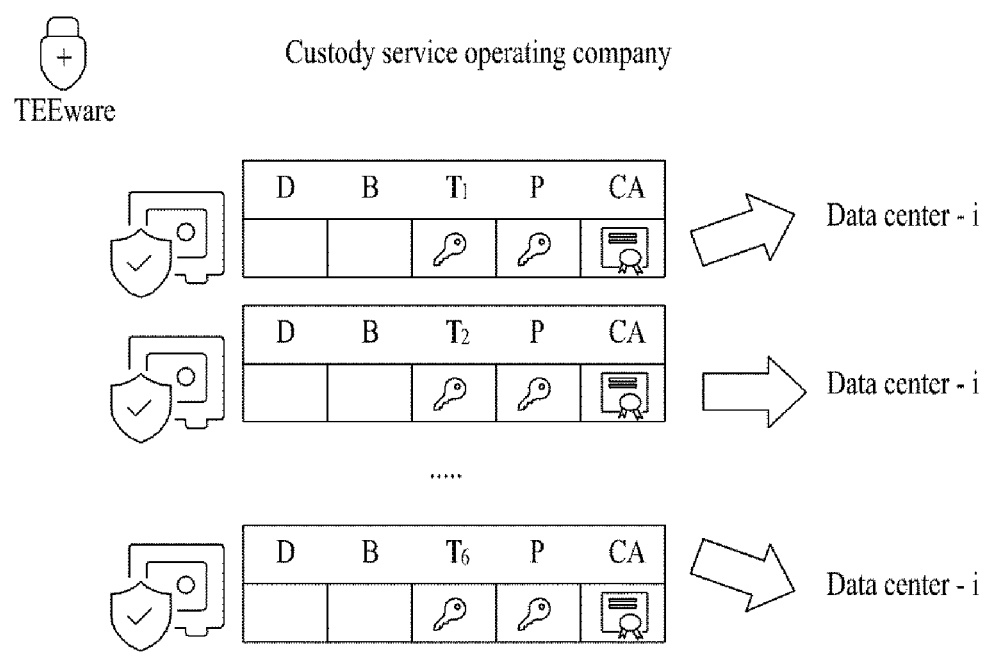

FIGS. 12 and 13 illustrate that a T key and a P key are generated and distributed. Referring to FIG. 12, an operating company may generate threshold keys $T_1, T_2, \ldots, T_n$ to be distributed and stored in clusters and the same shape encryption key P that may be shared by the clusters. In this case, the threshold keys and the same shape encryption key may be automatically distributed by a dealer program. In addition, various methods of distributing the threshold keys and the same shape encryption key may be present. The threshold key $T_i$ may be configured with one or more threshold key shares. For example, if the threshold key $T_i$ is to be configured with a 3-of-6 threshold, transactions need to be signed although any set of the threshold keys $T_1, T_2, T_3, T_4, T_5$, and $T_6$ are used. Furthermore, the same shape encryption key P is the encryption and decoding key of a Paillier cryptosystem, and needs to use a sufficiently large N value so that a threshold signature can be calculated.

Referring to FIG. 13, a vault node to which the threshold key $T_i$ and the same shape encryption key P have been distributed becomes the first vault node that configures an $i^{th}$ cluster. The vault node may be transmitted to a data center in which the $i^{th}$ cluster to which the vault node belongs is located.

Figure 14:
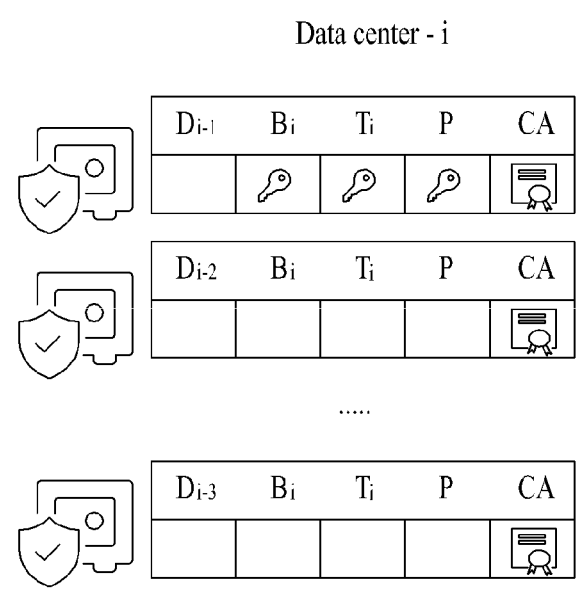

FIG. 14 illustrates that the internal key B of a cluster is generated. An administrator who is responsible for a cluster in a data center may configure an $i^{th}$ cluster based on the first vault node having an already generated threshold key $T_i$ and the same shape encryption key P. First, the administrator may request the first vault node to generate the internal key $B_i$ of the cluster. In this case, a key generation sequence is not related to the generation of a D key and the generation of a B key. The internal key $B_i$ of the cluster means a BIP-32 root seed to be shared between vault nodes (or devices) in the $i^{th}$ cluster.

Figure 15:
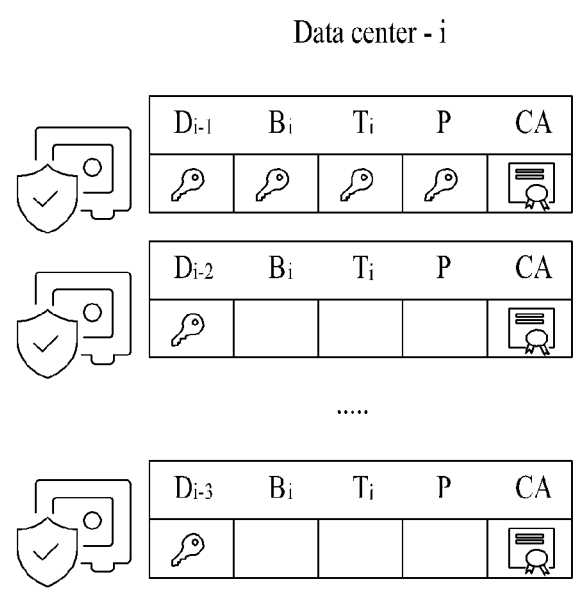

FIG. 15 illustrates that the B key, T key and P key of a cluster are duplicated. As described above, generated $B_i$ key, $T_i$ key, and $P_i$ key are synchronized with different vault nodes within the cluster and share the same key. When vault nodes belonging to the $i^{th}$ cluster are connected to the Intranet of the cluster, the vault nodes may access a bridge server and update key information belonging to the cluster and key information stored in the vault nodes. A synchronization process is described below.

A vault node may be connected to the Intranet of a cluster. The vault node may inquire the key list of the cluster through a bridge server. If a key not present in the vault node itself is present in the key list, the vault node may request a different vault node within a cluster in which the key is stored to duplicate the key. The different vault node in which the key is stored may identify whether the request of the vault node has been received from an authenticated device, and may duplicate the key. In this case, the duplication of the key may be performed through device authentication based on a certificate. For example, a vault node (e.g., vault node B) may transmit the certificate of the vault node to a different vault node while requesting the different vault node (e.g., vault node A) to send a key. After the different vault node verifies the certificate received from the vault node, it may encrypt a $B_i$ key using the public key of the vault node included in the certificate, and may transmit the encrypted $B_i$ key to the vault node. The vault node may receive the encrypted $B_i$ key, may decode the received $B_i$ key, and may store the decoded $B_i$ key. The subject that authenticates that the device is an authenticated device is a Device CA. A thorough guideline for a key management signature is necessary for the Device CA. A process of duplicating a key from a different vault node within a cluster to a vault node is described specifically below.

Figure 16:
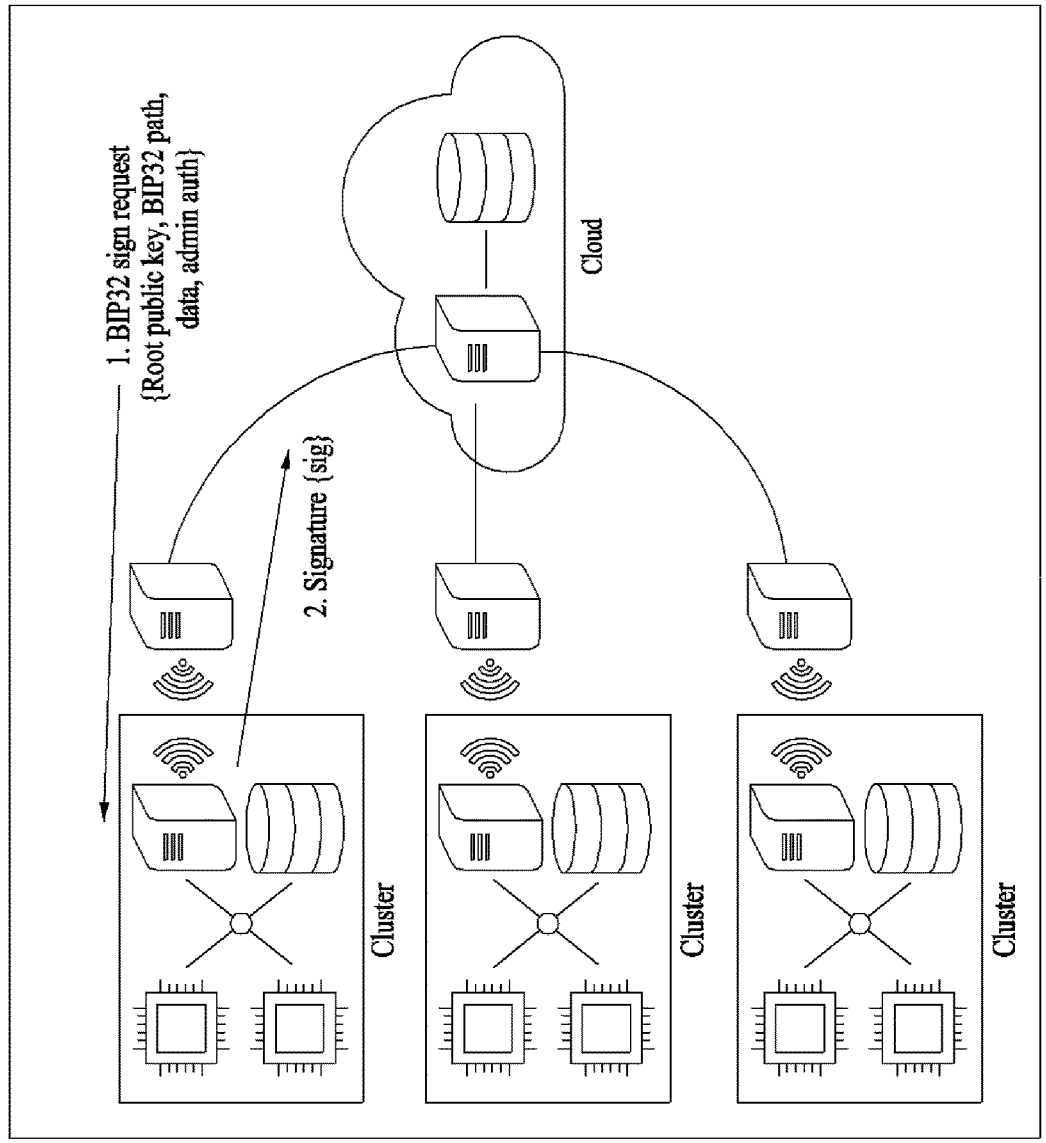
FIGS. 16 and 17 illustrates that transactions are signed in the system for storing and managing keys according to an embodiment.

FIG. 16 illustrates that transactions are signed using the B key.

One cluster may generate a private key according to the BIP-32 protocol from a B key, and may sign transactions.

A cloud server may request a signature from an external relay of one cluster. In this case, the cloud server may request a signature, including the BIP-32 root public key (i.e., the public key of a key corresponding to "m" in BIP-32) of a key to be signaled, a BIP-32 path to be signed, data to be signed (e.g., transactions hash), and authentication information (e.g., authentication information associated with request contents) of an administrator who has approved the signature.

When the cloud server transmits the request to an external relay and an internal relay, the internal relay may perform a signature using a vault node, may receive the results of the execution of the signature, and may transmit the results to the external relay. Accordingly, the cloud server may obtain the signature. The results of the execution of the signature may include an secp256k1 ECDSA signature (r, s, v value) obtained by signing the data using a BIP-32 path key.

Figure 17:
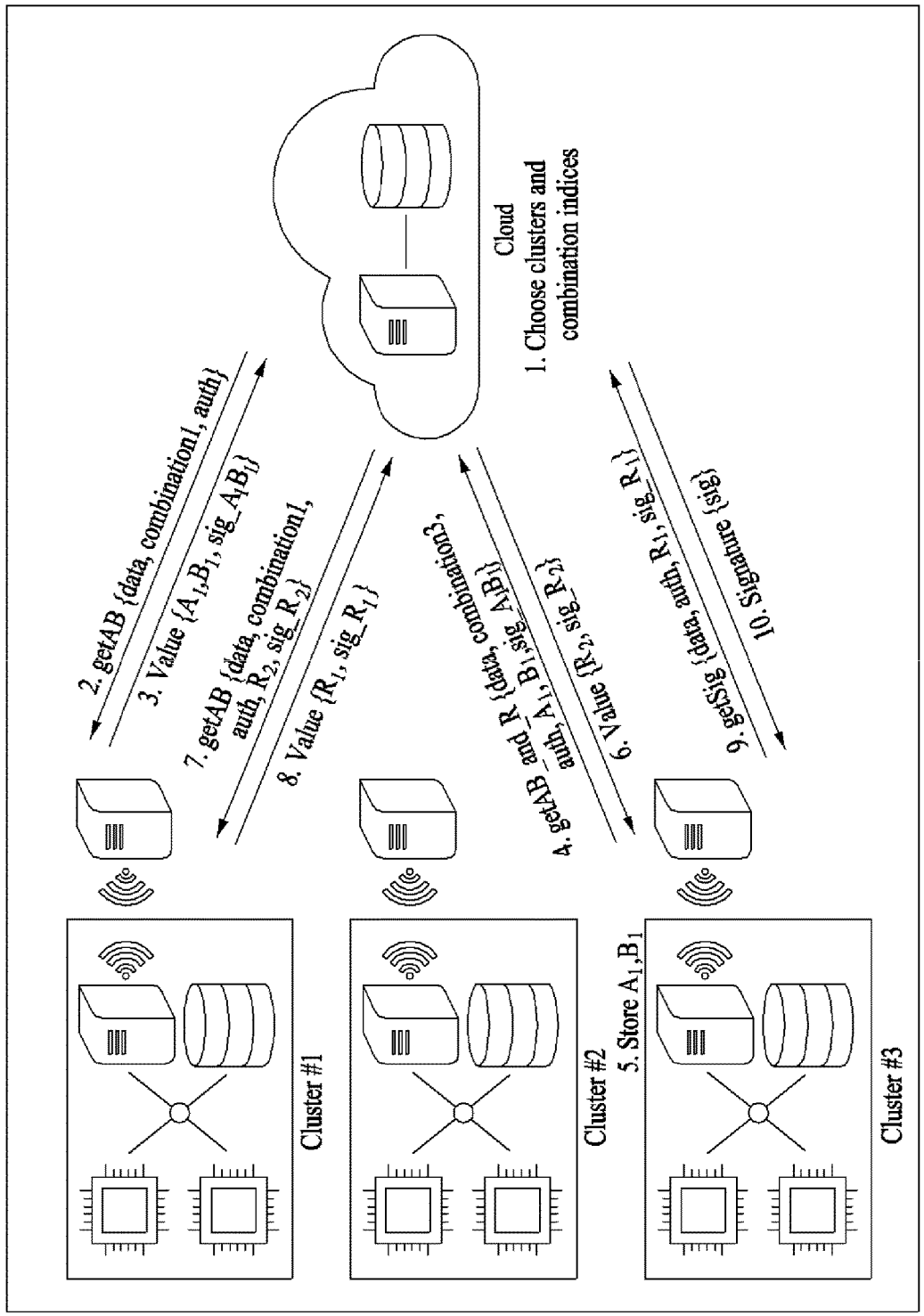

FIG. 17 illustrates that transactions are signed using a T key and a P key. Transactions may be signed using a T key and a P key according to a T-of-n threshold signature algorithm. An example in which if a cluster is installed in a 2-of-3 form, a cloud server requests a threshold transaction signature is described below. In this case, it is assumed that a T key is distributed to a plurality of clusters (three clusters in FIG. 17) according to the following method.

$$T_1 = \{x_2, x_3\}$$

$$T_2 = \{x_1, x_3\}$$

$$T_3 = \{x_1, x_2\}$$

The cloud server may determine that it will request a transaction signature from which two of the three clusters. In an embodiment, the cloud server may determine to sign transactions using a cluster #1 and a cluster #3. The cluster #1 uses combination indices Nos. 2 and 3 ($x_2$, $x_3$), and the cluster #3 uses a combination index No. 1 ($x_1$). The cloud server may transmit the request, including a combination 1={2, 3} value or a combination 3={1} value, to the clusters.

The cloud server may transmit a first signature (get AB) request to the cluster #1. All threshold signature-related requests transmitted by the cloud server may include data (e.g., transactions hash) to be signed, the combination index of a key to be signed, and data related to authentication information (e.g., authentication information associated with the contents of the request) of an administrator who has approved the signature.

The cluster #1 may calculate $A_1$ and $B_1$ values, may sign the calculated $A_1$ and $B_1$ values using a D key, and may return the signed values as first signature values. For example, $A_1 = E (z_2)*z_3$, $B_1 = E (x_2*z_2)*(x_3*z_3)$, and sig_$A_1B_1$=sign($D_{1-1}$, $A_1 \| B_1$) may be returned as the first signature values.

The cloud server may transmit a second signature (getAB_and_R) request to the cluster #2. In this case, the cloud server requests getAB_and_R as a second signature, but may transmit $A_1$, $B_1$, sig_$A_1B_1$, that is, the first signature values together. The internal relay of the cluster #2 may store $A_1$, $B_1$, and sig_$A_1B_1$. A vault node within the cluster #2 may identify whether $A_1$, $B_1$, and sig_$A_1B_1$ are values generated by an authenticated vault node. When the vault node within the cluster #2 identifies that $A_1$, $B_1$, and sig_$A_1B_1$ are values generated by the authenticated vault node, the vault node may calculate an $R_2$ value and transmit the $R_2$ value to the internal relay of the cluster #2 along with a signature. For example, the vault node within the cluster #2 may obtain $R_2 = x_1*G$, sig_$R_2$=sign ($D_{2-1}$, $R_2$) second signature value. The internal relay of the cluster #2 may return the $R_2$ and sig_$R_2$ values to the cloud server.

The cloud server may transmit a third signature (getR) request to the cluster #1. In this case, the cloud server may transmit the request including $R_2$ and sig_$R_2$, that is, the second signature values. A vault node within the cluster #1 may identify whether $R_2$ and sig_$R_2$ are values generated by an authenticated vault node. When the vault node within the cluster #1 identifies that $R_2$ and sig_$R_2$ are values generated by the authenticated vault node, the vault node may calculate $R_1$ and return the calculated $R_1$ along with a signature. The vault node may obtain $R_1 = x_2*x_3*R_1$, sig_$R_1$=sign ($D_{1-1}$, $R_1$) as the third signature values.

The cloud server may transmit a fourth signature (getSig) request to the cluster #2. In this case, the cloud server may transmit the request including $R_1$ and sig_$R_1$, that is, the third signature values. The cluster #2 may complete a signature by transmitting the $A_1$, $B_1$, and sig_$A_1B_1$ values and $R_1$, sig_$R_1$, stored in the internal relay within the cluster #2, to the vault node within the cluster #2. A result value obtained as the signature is completed may be s=D (calculate_mu ($A_1$, $B_1$, $R_1$, $x_1$)) mod q, sig={r, s, v}. As described above, a generated ECDSA signature value (fourth signature value) may be returned to the cloud server.

Figure 18:
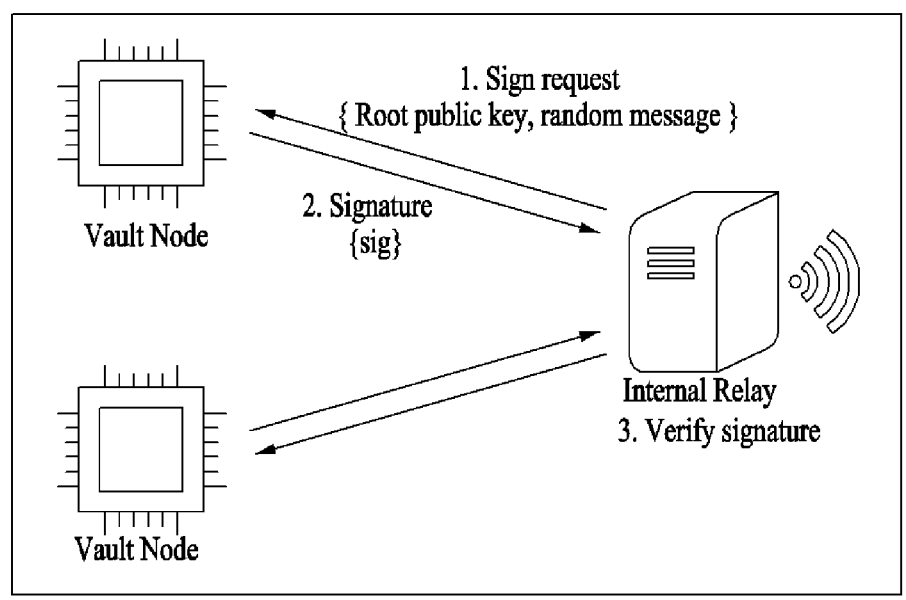
FIG. 18 is a diagram for illustrating that an audit is performed in the system for storing and managing keys according to an embodiment.

Referring to FIG. 18, an audit for identifying whether keys stored in the TEE of a vault node are well stored may be performed. When a given message is signed, whether keys stored in the TEE of a vault node are well stored may be determined based on whether the signature is well performed. A message signed for an audit may be limited to 8 bytes or less. A process of performing an audit using a B key is described. An internal relay may request a signature using a B key from a vault node with respect to a given message. In this case, the internal relay may request a signature for data, including the BIP-32 root public key (i.e., the public key of a key corresponding to "m" in BIP-32) of a key to be signed and a given message of 8 bytes or less. In order to prevent an unauthorized user from signing valid transactions using an audit function, the size of a message may be limited to 8 bytes or less. The vault node may perform a signature and return the results of the execution of the signature to the internal relay. The results of the execution of the signature may include an secp256k1 ECDSA signature obtained by signing the message using a BIP-32 root public key. Furthermore, a process of performing an audit using a T key and a P key by modifying the transaction signature method of FIG. 17 may be performed.

Figure 19:
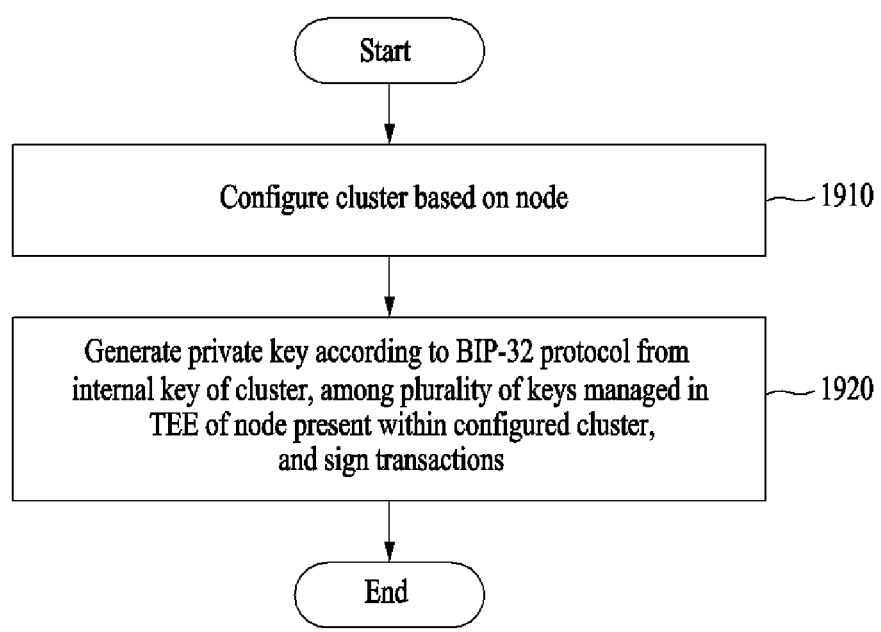
FIG. 19 is a flowchart illustrating a method of signing transactions based on a BIP-32 protocol from an internal key of a cluster in the system for storing and managing keys according to an embodiment.

FIG. 19 is a flowchart illustrating a method of signing transactions based on a BIP-32 protocol from an internal key of a cluster in the system for storing and managing keys according to an embodiment.

At step 1910, the system for storing and managing keys may configure a cluster based on a node. The system for storing and managing keys may store and manage a plurality of keys, including the first internal key of the cluster and the second internal key of the cluster in the TEE of the node. In this case, the first internal key of the cluster may be for a BIP-32 root seed, and the second internal key of the cluster may be for device authentication. In the system for storing and managing keys, a certificate (CA) for verifying an operating company and an administrator may be inserted and provided to each node. The node into which the certificate has been inserted may be transmitted to a data center in which a cluster to which the node belongs is located. The cluster may be configured based on each node in the data center. When the node is requested to generate the internal key of the cluster, the first internal key of the cluster may be generated. The system for storing and managing keys may generate the second internal key of the cluster for all nodes within the cluster, may store a device certificate approved through the generated second internal key of the cluster. When the first internal key of the cluster is synchronized with the nodes within the cluster, shared by the nodes, and the nodes within the cluster are connected to the Intranet of the cluster, the nodes may access a bridge server and update key information belonging to the cluster and key information stored in the nodes. In the system for storing and managing keys, when the node is connected to the Intranet of the cluster, the node may inquire the key list of the cluster through the bridge server. If a key not present in the node is included in the key list, the node may request a different node of a cluster in which the key is stored to duplicate the key. After the different node identifies whether the node that has requested the duplication is an authenticated device, it duplicates the key. In this case, if the node requests the different node to transmit the duplicated key, it transmits the certificate of the node to the different node. When the different node verifies the certificate of the node, the first internal key of the cluster of the node may be encrypted using the public key of the node included in the certificate. The encrypted first internal key of the cluster may be transmitted to the node. The node may decode and store the encrypted first internal key of the cluster.

At step 1920, the system for storing and managing keys may generate a private key according to the BIP-32 protocol from the internal key of the cluster, among a plurality of keys managed in the TEE of the node present within the configured cluster, and may sign transactions. In the system for storing and managing keys, a cloud server may request, from the external relay of the cluster, the signature including the BIP-32 root public key of a key to be signed, a BIP-32 path key to be signed, data to be signed, and authentication information of an administrator who has approved the signature. The cloud server may obtain the results of the signature, performed by the internal relay within the cluster that communicates with the external relay through a separate communication channel, when the node transmits the results to the external relay using the node within the cluster. In the system for storing and managing keys, the internal relay of the cluster may request, from the node within the cluster, the BIP-32 root public key of the key to be signed using the first internal key of the cluster with respect to a given message of 8 bytes or less and the given message. The node may return the results of the execution of the signature to the internal relay. Accordingly, the node may audit keys stored in the cluster.

FIG. 20 is a flowchart illustrating a method of signing transactions based on a threshold signature method using a key of a cluster in the system for storing and managing keys according to an embodiment.

At step 2010, the system for storing and managing keys may configure clusters based on a node to which a first key to be distributed and stored in clusters and a second key to be shared by clusters have been distributed. In this case, the first key may be a threshold key, and the second key may be the same shape encryption key. The system for storing and managing keys may store and manage a plurality of key, including the first internal key of the cluster, the second internal key of the cluster, the threshold key, and the same shape encryption key, in the TEE of the node. In this case, the threshold key is configured with at least one threshold key share. Transactions are signed by a combination of one or more of the plurality of threshold keys. The same shape encryption key is an encryption and decoding key and is for encrypting a middle value of threshold signatures. The first internal key of the cluster is a BIP-32 root seed. The second internal key of the cluster may be for device authentication. The system for storing and managing keys may generate a threshold key into which a certificate (CA) for verifying an operating company and an administrator has been inserted, which is provided to each node, and which will be distributed and stored in the cluster, and the same shape encryption key to be shared by clusters. The system for storing and managing keys may designate a node to which the threshold key and the same shape encryption key have been distributed as a first node configuring a cluster. The node may be transmitted to a data center in which the cluster to which the node belongs is located. The data center may configure the cluster based on the first node having the threshold key and the same shape encryption key. When the data center requests the first node to generate the internal key of the cluster, the first node may generate the first internal key of the cluster. The system for storing and managing keys may generate the second internal key of the cluster for all the nodes within the cluster, may store a device certificate approved through the generated second internal key of the cluster. When the first internal key of the cluster, the threshold key, and the same shape encryption key are synchronized with the nodes within the cluster, the nodes share the keys, and the nodes within the cluster are connected to the Intranet of the cluster, the node may access a bridge server and update key information belonging to the cluster and key information stored in the node. In the system for storing and managing keys, when the node is connected to the Intranet of the cluster, the node inquires the key list of the cluster through the bridge server. If a key not present in the node is present in the key list, the node requests a different node within a cluster in which the key is stored to duplicate the key. The different node identifies whether the node that has requested the duplication is an authenticated device, and then duplicates the key. When the node requests the different node to transmit the key, the node transmits the certificate of the node to the different node. When the different node verifies the certificate of the node, it may encrypt the first internal key of the cluster of the node using the public key of the node included in the certificate, and may transmit the encrypted first internal key of the cluster to the node. The node may decode and store the encrypted first internal key of the cluster.

At step 2020, the system for storing and managing keys may determine one or more clusters for a transaction signature, among the configured clusters.

At step 2030, in the system for storing and managing keys, the determined one or more clusters may sign transactions using the first key and the second key. In the system for storing and managing keys, the cloud server may request a first signature, including data to be signed for a first cluster of the determined one or more clusters, the combination index of a key to be signed, and authentication information of an administrator that has approved the signature, may calculate a first signature value from the first cluster, may sign the calculated first signature value using an internal key D of the cluster, and may return the signed first signature value. In the system for storing and managing keys, the cloud server may request a second signature, including the first signature value requested from the first cluster, from the second cluster of the determined one or more clusters. The second cluster may store the first signature value for the first signature. The node of the second cluster identifies whether the first signature value is a value generated by an authenticated node, and may return a second signature value including a calculated first confirmation value. In the system for storing and managing keys, the cloud server may request, from the first cluster, a third signature including the second signature value returned from the second cluster. The node of the first cluster may identify whether the second signature value is a value generated by an authenticated node, and may return a third signature value including a calculated second confirmation value. In the system for storing and managing keys, the cloud server may request a fourth signature, including the third signature value, from the remaining clusters other than the determined one or more clusters. The remaining clusters may return a fourth signature value obtained when they complete a signature using the first signature value and the third signature value stored in the second cluster.

A private key can be protected very safely against a hacker's attack because the private key is stored in an offline and isolated space. Furthermore, the system is designed to prevent program falsification and the leakage of important data based on a TEE. Major data may be designed to be encrypted when it is transmitted to the outside and to be decoded only when it is imported to the inside. Furthermore, even an internal administrator cannot access major information through an un-approved procedure due to the system safely designed assuming an intruder's threat. Furthermore, data can be safely retained although a failure occurs in some devices because major information is distributed and stored in a plurality of server. Furthermore, a private key that is not frequently used can be periodically checked in order to check whether the key is well stored and managed.

What is claimed is:

1. A transaction signature method performed in a system for storing and managing keys, which is implemented as a computer, comprising steps of:
    configuring a cluster based on a node; and
    generating a private key according to a BIP-32 protocol from an internal key of the cluster among a plurality of managed keys in a trusted execution environment (TEE) of the node within the configured cluster and signing transactions,
    wherein the step of signing the transactions comprises a step of requesting, by a cloud server, a signature comprising a BIP-32 root public key of a key to be signed, a BIP-32 path to be signed, data to be signed, or authentication information of an administrator who has approved the signature from an external relay of the cluster, and obtaining, by an internal relay within the cluster communicating with the external relay through a separate communication channel, the signature by transmitting results of execution of the signature to the external relay using the node within the cluster.

2. The method of claim 1, wherein the step of signing the transactions comprises a step of requesting, by the internal relay of the cluster, the signature comprising a BIP-32 root public key of a key to be signed and a given message of 8 bytes or less using a first internal key of the cluster from the node within the cluster, and returning, by the node, the results of the execution of the signature to the internal relay so that keys stored in the cluster are audited.

3. The method of claim 1, wherein:
    the step of configuring the cluster comprises a step of managing a plurality of keys comprising a first internal key of the cluster and a second internal key of the cluster in the TEE of the node,
    the first internal key of the cluster is a BIP-32 root seed, and
    the second internal key of the cluster is for device authentication.

4. A transaction signature method performed in a system for storing and managing keys, which is implemented as a computer, comprising steps of:
    configuring a cluster based on a node; and
    generating a private key according to a BIP-32 protocol from an internal key of the cluster among a plurality of managed keys in a trusted execution environment (TEE) of the node within the configured cluster and signing transactions, wherein the step of configuring the cluster comprises the steps of providing a certificate (CA) inserted into each node and for verifying an operating company and an administrator, transmitting the node into which the certificate has been inserted to a data center in which a cluster to which the node into which the certificate has been inserted belongs is located, configuring, by the data center, the cluster based on each node, and requesting the node to generate the internal key of the cluster so that a first internal key of the cluster is generated.

5. The method of claim 4, wherein the step of configuring the cluster comprises a step of:
    generating a second internal key of the cluster for all nodes present within the cluster,
    storing a device certificate approved through the generated second internal key of the cluster, and
    accessing, by the nodes, a bridge server and updating key information belonging to the cluster and key information stored in the nodes when the first internal key of the cluster is synchronized with the nodes within the cluster and shared and the nodes within the cluster are connected to an Intranet of the cluster.

6. The method of claim 5, wherein the step of configuring the cluster comprises a step of inquiring, by the node, a key list of the cluster through the bridge server when the node is connected to the Intranet of the cluster, requesting a duplication of a key not present in the node from a different node of the cluster in which the key is stored if the key is included in the key list, identifying, by the different node, whether the node that has requested the duplication is an authenticated device and duplicating the key, transmitting, by the node, a certificate of the node to the different node when the node requests the different node to transmit the key, verifying, by the different node, the certificate of the node, encrypting the first internal key of the cluster of the node using a public key of the node included in the certificate, transmitting the encrypted first internal key of the cluster to the node, and decoding and storing, by the node, the encrypted first internal key of the cluster.

* * * * *